US009179146B2

(12) United States Patent
Song et al.

(10) Patent No.: US 9,179,146 B2
(45) Date of Patent: Nov. 3, 2015

(54) ENCODING AND DECODING DEVICE AND METHOD USING INTRA PREDICTION

(75) Inventors: Jinhan Song, Seoul (KR); Jeongyeon Lim, Gyeonggi-do (KR); Yoonsik Choe, Gyeonggi-do (KR); Yonggoo Kim, Seoul (KR); Yung Ho Choi, Gyeonggi-Do (KR); Ji Hong Kang, Seoul (KR)

(73) Assignee: SK TELECOM. CO., LTD., Seoul (KR)

( * ) Notice: Subject to any disclaimer, the term of this patent is extended or adjusted under 35 U.S.C. 154(b) by 431 days.

(21) Appl. No.: 13/819,153

(22) PCT Filed: Aug. 26, 2011

(86) PCT No.: PCT/KR2011/006346
§ 371 (c)(1),
(2), (4) Date: Apr. 23, 2013

(87) PCT Pub. No.: WO2012/026794
PCT Pub. Date: Mar. 1, 2012

(65) Prior Publication Data
US 2013/0215958 A1 Aug. 22, 2013

(30) Foreign Application Priority Data
Aug. 26, 2010 (KR) ........................ 10-2010-0083026

(51) Int. Cl.
*H04N 11/02* (2006.01)
*H04N 19/50* (2014.01)
(Continued)

(52) U.S. Cl.
CPC ......... *H04N 19/00569* (2013.01); *H04N 19/11* (2014.11); *H04N 19/117* (2014.11); *H04N 19/147* (2014.11); *H04N 19/176* (2014.11); *H04N 19/61* (2014.11)

(58) Field of Classification Search
USPC ........................................ 375/240.01–240.02
See application file for complete search history.

(56) References Cited

U.S. PATENT DOCUMENTS

| 2007/0121731 | A1* | 5/2007 | Tanizawa et al. | 375/240.24 |
| 2010/0284458 | A1* | 11/2010 | Andersson et al. | 375/240.03 |
| 2010/0329341 | A1* | 12/2010 | Kam et al. | 375/240.16 |

FOREIGN PATENT DOCUMENTS

| KR | 1020060003794 | 1/2006 |
| KR | 1020060091436 | 8/2006 |

(Continued)

OTHER PUBLICATIONS

International Search Report mailed Apr. 4, 2012 for PCT/KR2011/006346.

*Primary Examiner* — Dave Czekaj
*Assistant Examiner* — Leron Beck
(74) *Attorney, Agent, or Firm* — Hauptman Ham, LLP

(57) ABSTRACT

The present disclosure relates to encoding and decoding apparatus and method using intra prediction. The encoding apparatus includes a reference pixel characteristics extractor for receiving reference pixel(s) included in neighboring blocks of a target block to encode to determine a reference pixel characteristic and determining whether adaptive filtering is applied to the reference pixel(s), based on reference pixel characteristic; a first intra predictor responsive to when the adaptive filtering is determined by the reference pixel characteristics extractor to be applied for comparing between results of performing intra prediction using high-frequency filtered reference pixel and intra prediction using high-frequency-unfiltered reference pixel to output the cost-efficient result along with filtering information indicating whether to perform filtering; and a second intra predictor for outputting the result of performing the intra prediction using the high-frequency-unfiltered reference pixel when the reference pixel characteristics extractor determines that the adaptive filtering is not to be applied.

24 Claims, 11 Drawing Sheets (A) 4x4 Intra Prediction Mode (B) 16x16 Intra Prediction Mode

(51) Int. Cl.
*H04N 19/176* (2014.01)
*H04N 19/147* (2014.01)
*H04N 19/61* (2014.01)
*H04N 19/11* (2014.01)
*H04N 19/117* (2014.01)

(56) References Cited

FOREIGN PATENT DOCUMENTS

| | | |
|---|---|---|
| KR | 1020060129096 | 12/2006 |
| KR | 1020100045007 | 5/2010 |

* cited by examiner (A) 4x4 Intra Prediction Mode (B) 16x16 Intra Prediction Mode

ENCODING AND DECODING DEVICE AND METHOD USING INTRA PREDICTION

TECHNICAL FIELD

The present disclosure in one or more embodiments relates to encoding and decoding apparatus and method using intra prediction. More particularly, the present disclosure relates to encoding and decoding apparatus and method which determine reference pixel characteristics of reference pixels included in neighboring blocks of a target block to be encoded or decoded and use the determination as a basis for performing any one of the adaptive filtering-based intra prediction or the typical intra prediction to decrease the required bit amount representing whether a filtering is performed, thereby improving coding efficiency.

BACKGROUND

The statements in this section merely provide background information related to the present disclosure and may not constitute prior art.

The state-of-the-art compression standard H.264/AVC enhances coding performance based on predictions using high correlations between neighboring pixels in intra coding.

The intra prediction by H.264/AVC provides a total of nine prediction modes for a block of 4×4 sized unit as illustrated in FIG. 1A, and a total of four prediction modes for a block of 16×16 sized unit as illustrated in FIG. 1B.

Meanwhile, H.264/AVC provides a total of nine intra prediction modes for a block of 8×8 sized unit as with the block of 4×4 sized unit, and first applies a filter for removing high frequency components to reference pixels of the neighboring blocks to be used for the prediction to smooth the reference pixels prior to performing the prediction [Document 1]. In the filtering process, the neighboring pixels may be changed to have values more suitable for the intra prediction to decrease intra prediction errors for target blocks.

However, the filtering for removing high frequency components of the reference pixels attenuates AC components actually present among original pixels, such that it may be difficult to provide details of block data to be predicted and in some cases, prediction performance or efficiency may be relatively more degraded than the case in which the filtering is not applied.

To solve the shortcoming, an adaptive filtering method was proposed by Fraunhofer Heinrich Hertz Institute (hereinafter, referred to as HHI) in HEVC that is a meeting for establishing a standard of the next-generation moving picture compression encoding/decoding device [Document 2].

The adaptive filtering method proposed by the HHI compares the prediction error occurring when the filtering for removing high frequency components is applied to each block for intra prediction against the prediction error occurring without the same filtering applied and as a comparison results, applies the smaller prediction errors to the actual encoding, thereby reducing the prediction errors.

However, the decoding apparatus requires an additional amount of information for each prediction block unit to perform indexing of whether or not to apply filtering, which may rather cause deteriorated compression efficiency for such images that would show little decrement of prediction errors with the adaptive filtering.

[Document 1]
1. Telecommunication Standardization sector of ITU, ""ITU-T Recommendation H.264, Series H: Audiovisual and Multimedia Systems, Advanced video coding for generic audiovisual services"", ITU-T Recommendation H.264, pp. 132-133, November 2007.

2. Martin Winken, Sebastian Boββe, ""Description of video coding technology proposal by Fraunhofer HHI"", Joint Collaborative Team on Video Coding (JCT-VC) of ITU-T SG16 WP3 and ISO/IEC JTC1/SC29/WG11, CfP response proposal JCTVC-A116, April 2010

DISCLOSURE

Technical Problem

In order to solve this problem, the present disclosure seeks to provide encoding and decoding device and method which determine reference pixel characteristics of reference pixels included in neighboring blocks of a target block to be encoded or decoded and use the determination as a basis for performing any one of the adaptive filtering-based intra prediction or the typical intra prediction to decrease the required bit amount representing whether a filtering is performed, thereby improving coding efficiency.

SUMMARY

An embodiment of the present disclosure provides an encoding apparatus using intra prediction, the apparatus including: a reference pixel characteristics extractor for receiving one or more reference pixel included in neighboring blocks of a target block to be encoded to determine a reference pixel characteristic and determining whether an adaptive filtering is applied to the one or more reference pixel, based on the reference pixel characteristic; a first intra predictor responsive to when the adaptive filtering is determined by the reference pixel characteristics extractor to be applied for comparing between results of performing an intra prediction using a high-frequency filtered reference pixel and an intra prediction using a high-frequency-unfiltered reference pixel to output cost-efficient one of the results involving costs along with filtering information indicating whether to perform filtering or not; and a second intra predictor for outputting the result of performing the intra prediction using the high-frequency-unfiltered reference pixel when the reference pixel characteristics extractor determines that the adaptive filtering is not to be applied.

The reference pixel characteristics extractor may use statistical characteristics of the one or more reference pixel to determine the reference pixel characteristic, use dispersion as the statistical characteristics, and determine that adaptive filtering is not applied when the dispersion is equal to or less than a preset threshold value.

In addition, the reference pixel characteristics extractor may detect whether edges are present in the neighboring blocks and when the edges are present, determine that the adaptive filtering is not to be applied.

Another embodiment of the present disclosure provides a decoding apparatus using intra prediction, the decoding apparatus including: a reference pixel characteristics extractor for receiving one or more reference pixel included in neighboring blocks of a target block to be decoded to determine a reference pixel characteristic and determining whether an adaptive filtering is applied to the one or more reference pixel, based on the reference pixel characteristic; a first intra predictor responsive to when the reference pixel characteristics extractor determines that the adaptive filtering is applied for extracting filtering information from encoded data received from an encoding apparatus and using extracted filtering information as a basis for outputting either one of the results of performing an intra prediction using a high-frequency filtered reference pixel and an intra prediction using a high-frequency-unfiltered reference pixel; and a second intra predictor responsive to when the reference pixel characteristics extractor determines that the adaptive filtering is not applied for determining that the filtering information is not present in the encoded data and outputting the result of performing the intra prediction using the high-frequency-unfiltered reference pixel.

Yet another embodiment of the present disclosure provides an encoding method using intra prediction, the encoding method including: a reference pixel characteristics extraction process for receiving one or more reference pixel included in neighboring blocks of a target block to be encoded to determine a reference pixel characteristic and determining whether an adaptive filtering is applied to the one or more reference pixel, based on the reference pixel characteristic; a first intra prediction process responsive to when the adaptive filtering is determined in the reference pixel characteristics extraction process to be applied for comparing between results of performing an intra prediction using a high-frequency filtered reference pixel and an intra prediction using a high-frequency-unfiltered reference pixel to output cost-efficient one of the results involving costs along with filtering information indicating whether to perform filtering or not; and a second intra prediction process for outputting the result of performing the intra prediction using the high-frequency-unfiltered reference pixel when the reference pixel characteristics extracting process determines that the adaptive filtering is not to be applied.

Yet another embodiment of the present disclosure provides a decoding method using intra prediction, the decoding method including: a reference pixel characteristics extraction process for receiving one or more reference pixel included in neighboring blocks of a target block to be decoded to determine a reference pixel characteristic and determining whether an adaptive filtering is applied to the one or more reference pixel, based on the reference pixel characteristic; a first intra prediction process responsive to when the reference pixel characteristics extracting process determines that the adaptive filtering is applied for extracting filtering information from encoded data received from an encoding apparatus and using extracted filtering information as a basis for outputting either one of the results of performing an intra prediction using a high-frequency filtered reference pixel and an intra prediction using a high-frequency-unfiltered reference pixel; and a second intra prediction process responsive to when the reference pixel characteristics extractor determines that the adaptive filtering is not applied for determining that the filtering information is not present in the encoded data and outputting the result of performing the intra prediction using the high-frequency-unfiltered reference pixel.

Advantageous Effects

The present disclosure as described above can determine the reference pixel characteristics included in the neighboring blocks of the target block to be encoded and determine whether to perform the adaptive filtering-based intra prediction or the typical intra prediction based on the determined reference pixel characteristics to perform the encoding, thereby reducing the generation frequency of additional information generated by the adaptive filtering. As a result, the present disclosure as described above can provide the higher compression encoding efficiency, control the strictness and leniency of the determination criterion on whether to apply the adaptive filtering to provide the efficient rate-distortion control factor of the video compression encoder, and decrease the complexity of the encoding and decoding processes occurring due to the repetitive filtering and the intra prediction cycles when the adaptive filtering is omitted.

DETAILED DESCRIPTION

Figure 1A:
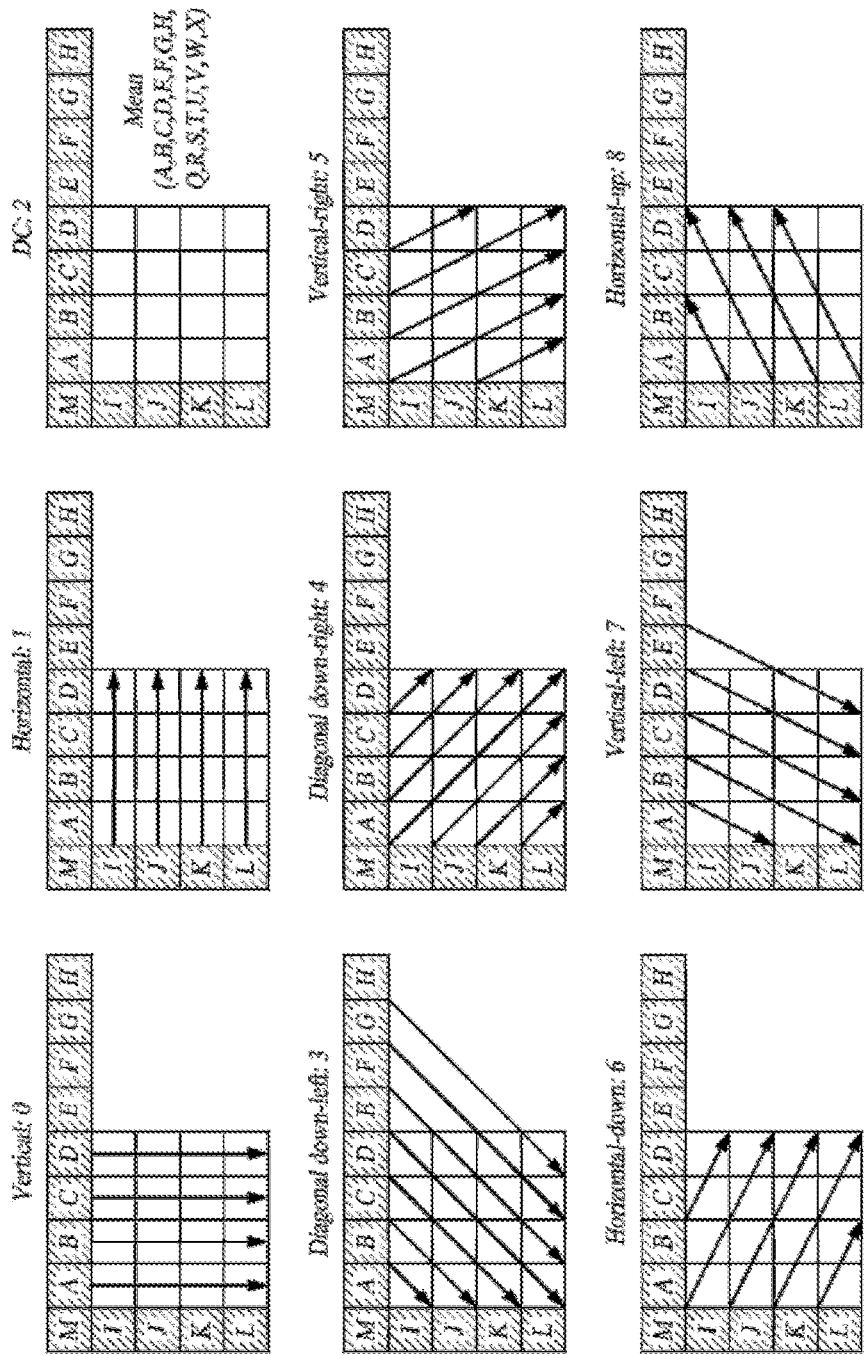
FIG. 1 is a diagram for illustrating an intra prediction mode.
Figure 1B:
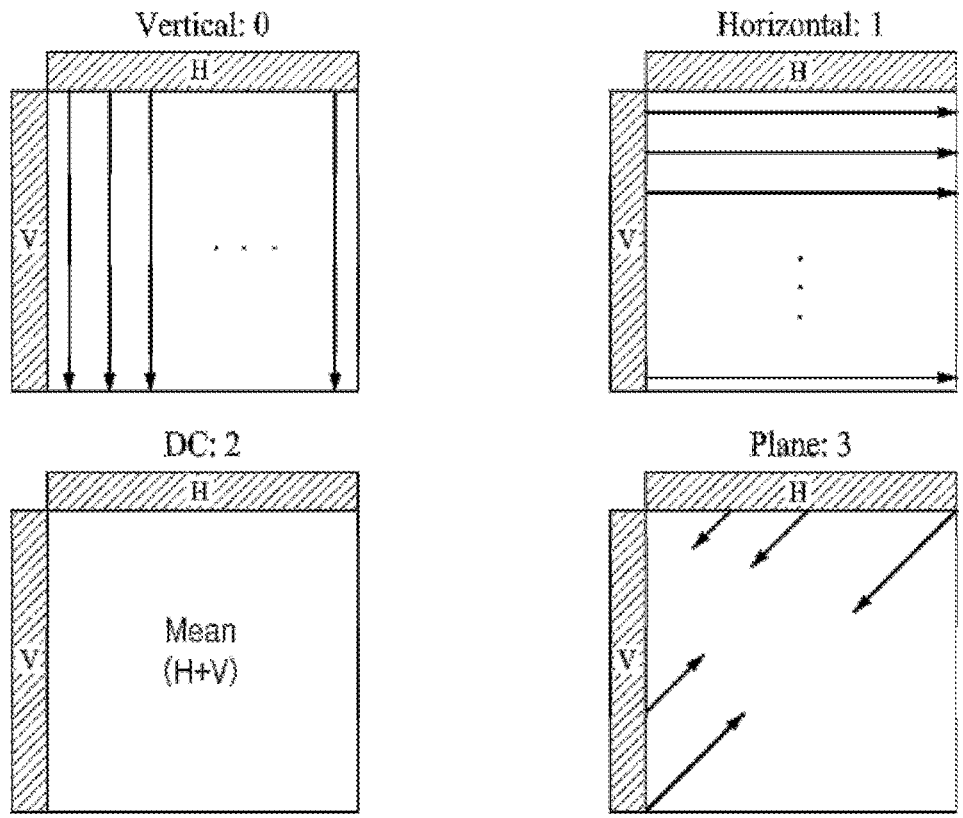

Hereinafter, embodiments of the present disclosure will be described in detail with reference to the accompanying drawings. In the following description, like reference numerals designate like elements although they are shown in different drawings. Further, in the following description of the present embodiments, a detailed description of known functions and configurations incorporated herein will be omitted for the purpose of clarity.

Additionally, in describing the components of the present disclosure, there may be terms used like first, second, A, B, (a), and (b). These are solely for the purpose of differentiating one component from the other but not to imply or suggest the substances, order or sequence of the components. If a component were described as 'connected', 'coupled', or 'linked' to another component, they may mean the components are not only directly 'connected', 'coupled', or 'linked' but also are indirectly 'connected', 'coupled', or 'linked' via a third component.

Figure 2:
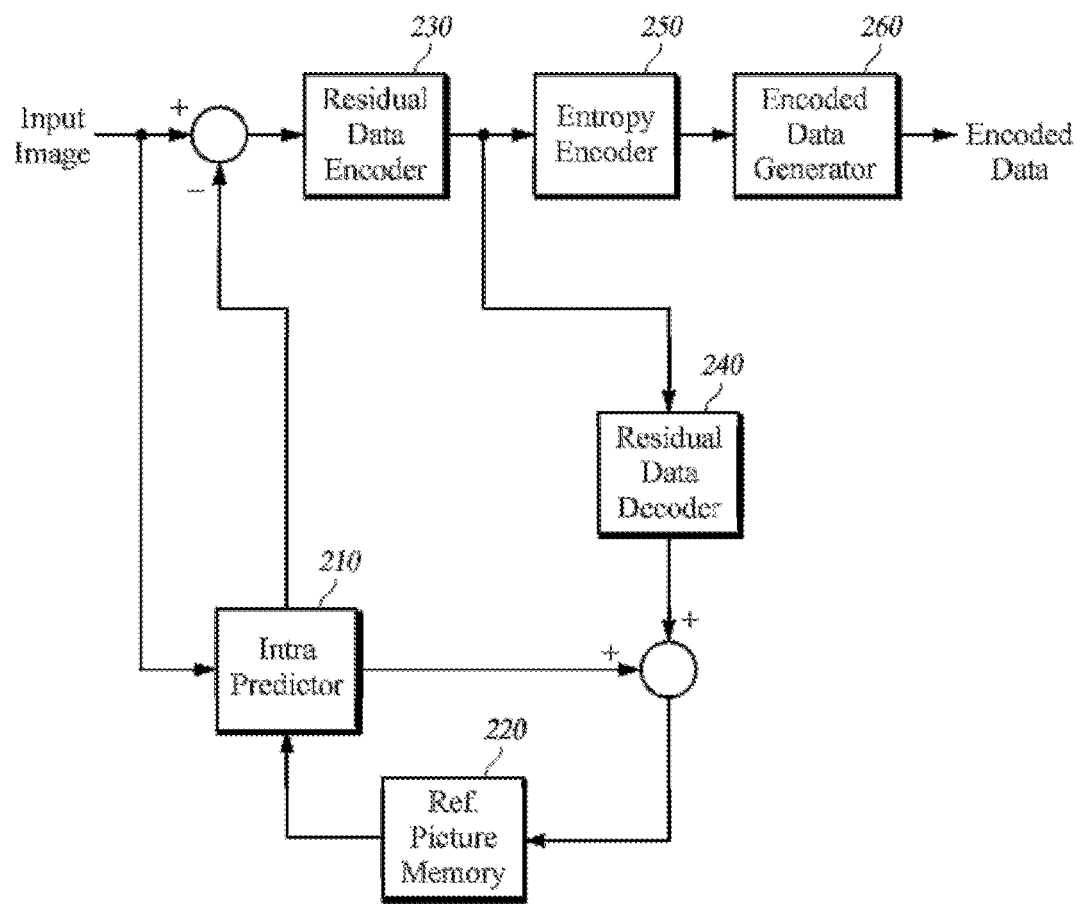
FIG. 2 is a block diagram for illustrating an encoding apparatus according to one or more embodiment of the present disclosure.

FIG. 2 is a block diagram for illustrating an encoding apparatus according to one or more embodiment of the present disclosure.

As illustrated in FIG. 2, the encoding apparatus according to one or more embodiment of the present disclosure may include an intra predictor 210, a reference picture memory 220, a residual data encoder 230, a residual data decoder 240, an entropy encoder 250, and an encoded data generator 260, and the like.

Herein, the encoding apparatus may represent a personal computer (PC), a notebook computer, a personal digital assistant (PDA), a portable multimedia player (PMP), a PlayStation Portable (PSP), a mobile communication terminal, and the like, and may mean various apparatuses including a communication device such as a communication modem that performs communication with various devices or wired/wireless communication networks, a memory that stores various programs and data to encode images, a microprocessor that executes programs so as to perform calculation and control, and the like.

A video to be encoded may be input in a block unit, and the block may be a macroblock. For convenience of explanation, in one or more embodiment of the present disclosure the macroblock is defined as a 16×16 form by the same method as a H.264/AVC standard, but a general form of macroblock may be M×N. In particular, M and N may each be larger than 16 and may be different integers from each other or the same integer.

The intra predictor 210 uses reference pixel values available in a current block and neighboring blocks spatially located around the current block to generate an intra prediction block of the current block. In this case, the intra prediction block is generated by calculating error values between the current block and the intra prediction block for each of the available intra prediction modes and applying an intra prediction mode having a minimum error value. Further, information on the intra prediction mode is transferred to the encoded data generator 260 by encoding the intra prediction mode having the minimum error value.

In particular, the intra predictor 210 according to one or more embodiment of the present disclosure extracts reference pixels included in neighboring blocks of a target block to be encoded from the reference picture memory 220, prior to generating the intra prediction block to determine the reference pixel characteristics. Further, it is determined whether to perform an adaptive filtering-based intra prediction or a typical intra prediction based on the determined reference pixel characteristics, and the intra prediction block for the target block to be encoded is generated by using any one of the prediction methods based on the determination. The adaptive filtering-based intra prediction means an intra prediction method for outputting cost-efficient one of the resultant intra prediction after performing the high-frequency filtering on the reference pixels included in the neighboring blocks and the resultant intra prediction without performing the high-frequency filtering. Herein, upon outputting the intra prediction result, the filtering information indicating whether the high-frequency filtering is applied to the intra prediction is output.

The intra predictor 210 will be described below in detail with reference to FIGS. 3 to 7.

The result (intra prediction block) output from the intra prediction block 210 is subtracted from the block to be encoded and thereby generated as a residual block which is output to the residual data encoder 230.

The residual data encoder 230 performs a transform and a quantization operation on the residual blocks to generate an encoded residual block. In this case, various transform methods may be used for transforming a signal of a spatial domain into a signal of a frequency domain, such as Hadamard transform and discrete cosine transform, and various quantization methods may be used, such as uniform quantization including a dead zone and quantization matrix.

According to one or more embodiment of the present disclosure, the transform block may have a size that does not exceed a size of the prediction block. For example, if the size of the prediction block is 16×16, the transform blocks of the same size 16×16 may be used as well as smaller 16×8, 8×16, 8×8, 8×4, 4×8, 4×4 and so on. If the size of the prediction block is 8×8, the transform blocks, such as 8×8, 8×4, 4×8, and 4×4 that do not exceed 8×8, may be used. If the size of the prediction block is 4×4, only the 4×4 transform block may be used. Further, the size of the transform block may be selected as a reference of rate-distortion optimization. As described above, if the size of the transform block does not exceed the size of the transform block, the residual data encoder 230 divides the residual blocks into the same size of sub-blocks as the transform block and sequentially transforms and quantizes the sub-blocks.

According to one or more embodiment of the present disclosure, the size of the transform block may exceed the size of the prediction block. For example, if the size of the prediction block is 16×16, transform blocks may be used by the sizes such as 32×16, 16×32, 32×32, 64×32, 32×64, 64×64. As such, if the size of the transform block is larger than that of the prediction block, the residual data encoder 230 combines a plurality of spatially neighboring residual blocks to generate, transform, and quantize the combined residual block that is equal to the size of the transform block.

The residual data decoder 240 dequantizes and inverse transforms the residual blocks that are transformed and quantized by the residual data encoder 220 to reconstruct the residual blocks. The dequantization and the inverse transform reversely perform the transform and quantization processes that are performed by the residual data encoder 230 and may be implemented by various methods. For example, the residual data encoder 230 and the residual data decoder 240 may use the same transform and inverse transform processes or the same quantization and dequantization processes in their pre-agreement. Alternatively, the residual data decoder 240 may use transform and quantization process information (for example, information on a transform size, a transform shape, a quantization type, and the like) which is generated and transferred by the transform and quantization processes of the residual data encoder 230, to reversely perform the transform and quantization processes of the residual data encoder 230, thereby performing the dequantization and the inverse transform.

The residual block output from the residual data decoder 240 is added to the prediction block reconstructed by the intra predictor 210 to generate a reconstructed block which is stored in the reference picture memory 220 and the stored reconstructed block is subsequently used as a reference picture for encoding the block to be encoded.

The entropy encoder 250 entropy-encodes and outputs the residual block output from the residual data encoder 230. Although not illustrated in one or more embodiment of the present disclosure, if necessary, the entropy encoder 250 may encode a variety of information required to decode encoded bit streams as well as the residual blocks. Herein, a variety of information required to decode the encoded bit streams may include information on a macroblock type, information on the intra prediction mode, information on the transform and quantization types, filtering information indicating whether the high-frequency removal filtering is performed on the reference pictures used for the intra prediction, and the like.

The entropy encoder 250 may use a variety of entropy encoding methods, such as context adaptive variable length coding (CAVLC) and context adaptive binary arithmetic coding (CABAC).

The encoded data generator 260 aligns the entropy encoded residual block, the information on the macroblock type, the intra prediction mode, and the like so as to be output as the encoded data. Further, if the intra predictor 210 performs the adaptive filtering-based intra prediction, the encoded data generator 260 also outputs as the encoded data the filtering information indicating whether the filtering is performed. However, if the intra predictor 210 does not perform the adaptive filtering-based intra prediction, no filtering information is included in the encoded data.

Hereinafter, the more detailed configuration of the intra predictor 210 according to one or more embodiment of the present disclosure will be described with reference to FIGS. 3 to 7.

Figure 3:
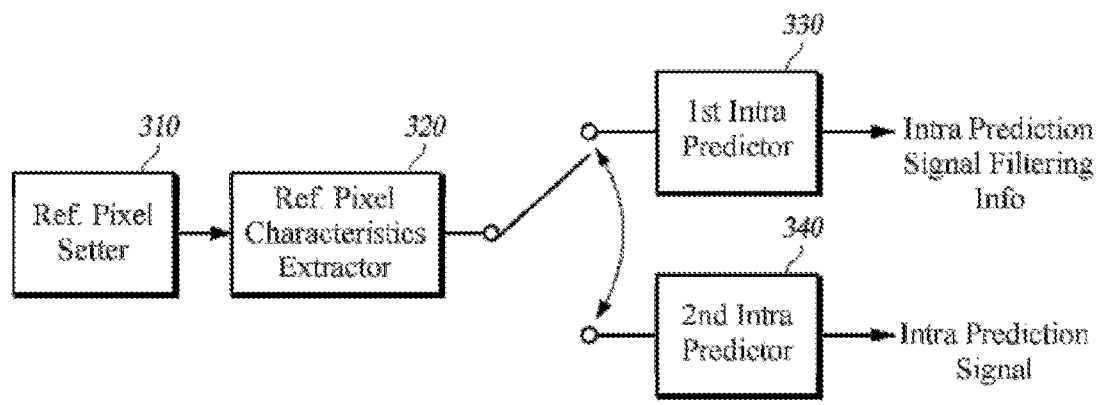
FIG. 3 is a block diagram for illustrating a configuration of an intra predictor of the encoding apparatus according to one or more embodiment of the present disclosure.

FIG. 3 is a block diagram for illustrating a configuration of the intra predictor according to one or more embodiment of the present disclosure.

The intra predictor 210 according to one or more embodiment of the present disclosure may include a reference pixel setter 310, a reference pixel characteristics extractor 320, a first intra predictor 330, a second intra predictor 340, and the like.

The reference pixel setter 310 extracts pixels (reference pixels) of neighboring blocks of the target block to be encoded from the reference picture memory 220. The neighboring blocks of the target block to be currently encoded should have completed their block based encoding and decoding processes and set the pixel values of the corresponding neighboring blocks to be referenceable by the time of encoding the current block. However, some encoding processes performed may make the pixel values of the neighboring blocks to be unusable, and such unusable pixels of the neighboring blocks are processed by the reference pixel setter 310. That is, the reference pixel setter 310 checks whether the pixel values of the neighboring blocks are present and when there are neighboring pixels that cannot be referenced, the corresponding reference values are filled with products from an arbitrary operation.

The reference pixel characteristics extractor 320 receives the reference pixel values processed by the reference pixel setter 310 to determine reference pixel characteristics and uses the determination as a basis for determining whether to transfer the reference pixel values to the first intra predictor 330 that performs the adaptive filtering-based intra prediction or the second intra predictor 340 that performs the typical intra prediction.

Herein, the reference pixel characteristics may include statistical characteristics of the reference pixels, intra-image characteristics configured by the reference pixels, or the like and one or more embodiment of the present disclosure uses dispersion as the statistical characteristics and the presence or absence of edges as the intra-image characteristics. However, this is only one embodiment, but is to be construed to be included in the scope of the present disclosure if it may be determined which of the adaptive filtering-based intra prediction and the typical intra prediction has the excellent coding efficiency and performance.

Figure 4:
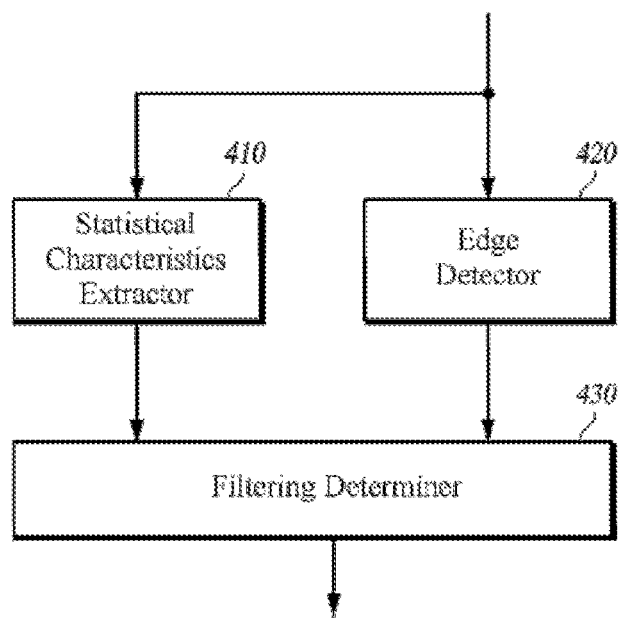
FIG. 4 is a diagram for illustrating a configuration of a reference pixel characteristics extractor 320 according to one or more embodiment of the present disclosure.

FIG. 4 is a diagram illustrating a configuration of the reference pixel characteristics extractor 320 according to one or more embodiment of the present disclosure. Referring to FIG. 4, the reference pixel characteristics extractor 320 may include a statistical characteristics extractor 410, an edge detector 420, and a filtering determiner 430.

The statistical characteristics extractor 410 operates the dispersion of the reference pixels to determine whether the dispersion is at a preset threshold value or less. Herein, the threshold value may be determined by various methods and as one example, the following Equation 1 may be used.

$$T = \left\lfloor \frac{Qstep^2 + 8}{16} \right\rfloor \quad \text{Equation 1}$$

In the above Equation 1, T represents the threshold value and Qstep represents the width of a quantization interval. Further, T means the largest information among integers smaller than x.

The edge detector 420 uses the reference pixels included in the neighboring blocks of the target block to be encoded to detect whether the edges are present in the neighboring blocks.

The edge is a feature representing a boundary between regions within an image and corresponds to a discontinuous point. Therefore, the edges can be detected if a change in a gradient of image brightness is obtained using a differentiation or partial differentiation operation or a mask (operator) performing the role of a differential operation. Among edge detection methods using the mask, the representative method uses Sobel Mask. In addition to this, there are methods such as Roberts Mask, a Laplacian Mask, and Canny Mask.

One or more embodiment of the present disclosure uses the method for detecting edges using the Sobel Mask, but is not limited thereto, and therefore, various methods for detecting edges of an image are to be construed to be included in the scope of the present disclosure.

The method for extracting edges using the Sobel Mask applies the following mask to an image so as to detect edges.

$$\begin{bmatrix} -1 & -2 & -1 \\ 0 & 0 & 0 \\ +1 & +2 & +1 \end{bmatrix} \begin{bmatrix} +1 & 0 & -1 \\ +2 & 0 & -2 \\ +1 & 0 & -1 \end{bmatrix}$$

Since the image is configured to be two-dimensional, the gradient of the image brightness in a vertical direction (y-axis direction) and the gradient of the image brightness in a horizontal direction (x-axis direction) need to be obtained, in which a left mask is to obtain the gradient in a vertical direction and a right mask is to obtain the gradient in a horizontal direction.

Figure 5:
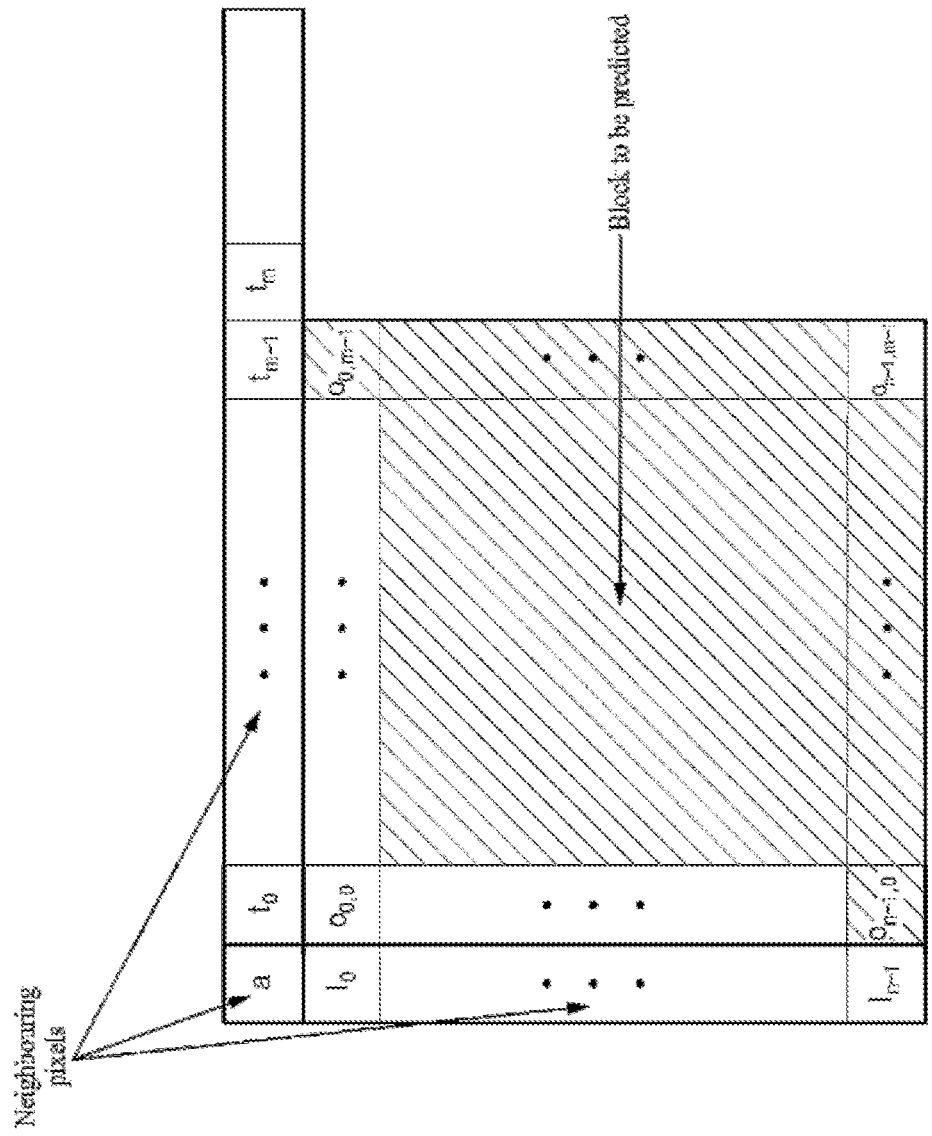
FIG. 5 is a diagram for illustrating an area applied with Sobel Mask within neighboring blocks for detecting edges.

The magnitude of the gradients is calculated by applying the two masks to the neighboring blocks, and FIG. 5 illustrates a region to which the Sobel Mask is applied where different sizes of the blocks used for the prediction may change the size of the neighboring region from which the edges is to be extracted.

The magnitude of the gradients may be operated by the following Equation 2 that sets a central element value (element (2, 2) of a matrix) to Gy and Gx respectively as calculated by multiplying each pixel value of an image by each of the left and right masks.

$$G = \sqrt{G_x^2 + G_y^2} \quad \text{Equation 2}$$

If the values of the magnitude of the gradients are larger than the preset threshold value T, it may be determined that the edges are present in the corresponding regions.

If the statistical characteristics extractor 410 determines that the dispersion is at the preset threshold value or less or if the edge detector determines that the edges are present, it is determined that the filtering determiner 430 does not apply the adaptive filtering to transfer the reference pixels to the second intra predictor 340 that performs the typical intra prediction. Otherwise, however, when the dispersion is larger than the preset threshold value and the edges are not detected, it is determined that the filtering determiner 430 applies the adaptive filtering to transfer the reference pixels to the first intra predictor 330 that performs the adaptive filtering-based intra prediction.

If the dispersion of the reference pixels is small enough to approximate 0, the high-frequency filtered reference pixels have values very close to original high-frequency-unfiltered reference pixels that are not subjected to the high-frequency filtering. In this case, therefore, the adaptive filtering-based intra prediction is not performed, obviating the need to use index bits for indicating whether the filtering is performed, thereby improving the coding efficiency.

In addition, when the edges are present in the neighboring blocks of the target block to be encoded, the edges may be blurred if the filtering is applied to the reference pixels to give rise to a large error. Even in this case, therefore, the determination not to use the adaptive filtering-based intra prediction can improve the coding performance, and as the index bits are not used for indicating whether the filtering is performed or not, the coding efficiency can be improved.

Meanwhile, one or more embodiment of the present disclosure describes that the reference pixel characteristics are determined using both of the statistical characteristics of the reference pixels and the presence or absence of the edges, but the present disclosure is not limited thereto, and therefore the reference pixel characteristics may be determined using only any one of the methods.

Referring back to FIG. 3, the first intra predictor 330 performs the adaptive filtering-based intra prediction if it is determined that the reference pixel characteristics extractor 320 applies the adaptive filter.

Figure 6:
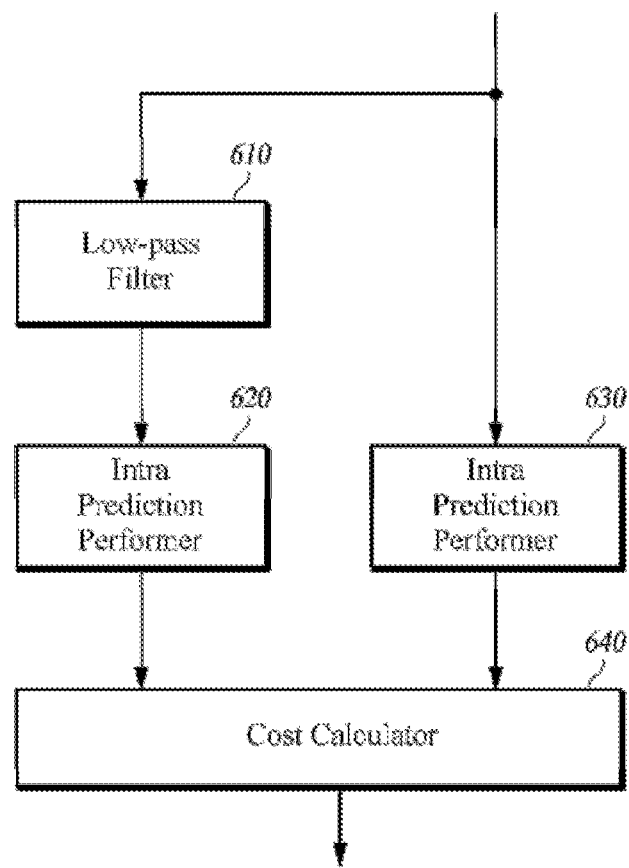
FIG. 6 is a block diagram for illustrating a configuration of a first intra predictor for performing an adaptive filtering-based intra prediction according to one or more embodiment of the present disclosure.

FIG. 6 is a block diagram for illustrating a configuration of the first intra predictor for performing an adaptive filtering-based intra prediction according to one or more embodiment of the present disclosure. Referring to FIG. 6, the first intra predictor may include a low pass filter 610, intra prediction performers 620 and 630, a cost calculator 640, and the like.

The low pass filter 610 removes the high frequency components from the reference pixels and transfers the reference pixels to the intra prediction performer 620 and the intra prediction performer 620 performs the intra prediction by using the reference pixels with the high frequency components removed and transfers the results to the cost calculator 640.

The intra prediction performer 630 performs the intra prediction by using the values of the original high-frequency-unfiltered reference pixel and transfers the results to the cost calculator.

The cost calculator 640 calculates costs required to encode data using the results (that is, the intra prediction results of using the high-frequency filtered reference pixels) performed by the intra prediction performer 620 and costs required to encode data using the results (that is, the intra prediction results of using the high-frequency-unfiltered reference pixels of operation by the intra prediction performer 630 and outputs the cost-efficient results. Herein, costs may be obtained by using rate-distortion or a bit amount required to encode data.

Meanwhile, when outputting the intra prediction results, the cost calculator 640 also outputs the filtering information indicating whether the high-frequency filtering was performed.

Figure 7:
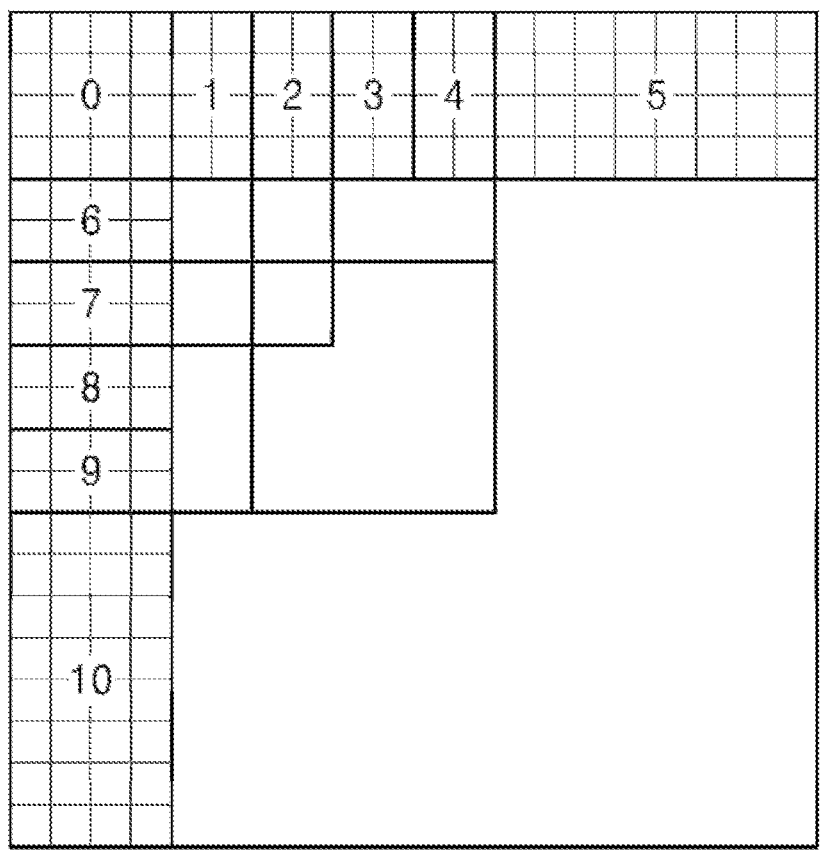
FIG. 7 is an exemplary diagram for explaining the first intra predictor for performing the adaptive filtering-based intra prediction according to one or more embodiment of the present disclosure.

FIG. 7 is an exemplary diagram for explaining the first intra predictor for performing the adaptive filtering-based intra prediction according to one or more embodiment of the present disclosure.

The block of size n×m to undergo the intra prediction and the reconstructed reference pixel may be represented as follows.

A target block O to be encoded in n×m sized arrangement is as follows:

$$O = \begin{bmatrix} o_{0,0} & \cdots & o_{0,m-1} \\ \vdots & \ddots & \vdots \\ o_{n-1,0} & \cdots & o_{n-1,m-1} \end{bmatrix}$$

A prediction block P in the arrangement of n×m generated by predicting the target block O is as follows:

$$P = \begin{bmatrix} p_{0,0} & \cdots & p_{0,m-1} \\ \vdots & \ddots & \vdots \\ p_{n-1,0} & \cdots & p_{n-1,m-1} \end{bmatrix}$$

The reconstructed pixel values of the previous block are used as reference pixels for the current prediction block P. FIG. 7 illustrates an example of the reconstructed reference pixels that can be referenced.

$I=[I0, \ldots, In-1]$

Further, the reconstructed upper pixel values are represented as follows.

$t=[t0, \ldots, tm-1, \ldots]$

Further, the reconstructed left upper pixel values are defined by 'a'. With their encoding and decoding processes completed prior to the current block, the respective pixels of I, t, and a are represented by 'available'.

When the adaptive filtering is performed, the low pass filter is defined as follows as it has a length of k for smoothing the reference pixels used for the intra prediction prior to performing the intra prediction on the original block O.

$f=[f0, \ldots, fk-1]$

The above filter coefficients generate the smoothed reference pixel vector by applying a convolution operation as the following Equation 3 to reference pixel vectors I and t.

$$g_1(x) = \sum_{\tau=0}^{k-1} f(\tau)l(x-\tau), x = 0, 1, \ldots, n-1 \quad \text{Equation 3}$$

$$g_2(x) = \sum_{\tau=0}^{k-1} f(\tau)t(x-\tau), x = 0, 1, \ldots, m-1$$

In this case, in the operation of the first and final elements (t=0, t=n−1 or t=m−1) of g1 and g2, a value of f may be exceptionally changed.

The low pass filter 610 of FIG. 6 performs the high-frequency filtering on the original reference pixels depending on the Equation 2. In addition, the intra prediction performer 620 uses the reference pixel vectors g1 and g2 output from the low pass filter 610 to perform the intra prediction.

Meanwhile, the intra prediction performer 630 uses the original reference pixel vectors I and t without high-frequency filtering to perform the intra prediction.

Further, the cost calculator 640 compares the costs when the encoding is performed using the intra prediction results based on the reference pixel vectors g1 and g2 with the costs when the encoding is performed using the intra prediction results based on the original reference pixel vectors I and t to output the cost-efficient intra prediction results. Further, the intra prediction results output by the cost calculator 640 are output along with the filtering information indicating whether the results are from using the high-frequency filtered reference pixels or not.

Referring back to FIG. 3, if the reference pixel characteristics extractor determines not to apply the adaptive filtering, the second intra predictor 340 uses the high-frequency-unfiltered reference, that is, the original reference pixel vectors I and t to perform the intra prediction and outputs the results. In this case, as the second intra predictor does not use the adaptive filtering method, there is no need to output the filtering information indicating whether the high-frequency filtering is used for the intra prediction.

According to one or more embodiment of the present disclosure as described above, if the reference pixel characteristics extractor 320 determines to apply the adaptive filtering, the filtering information is required for indicating whether the high-frequency filtering was used the intra prediction, but if it is determined that the reference pixel characteristics extractor 320 determines not to apply the adaptive filtering, the filtering information is not required, such that the bit amount required to indicate whether there was a filtering performed may be saved.

Figure 8:
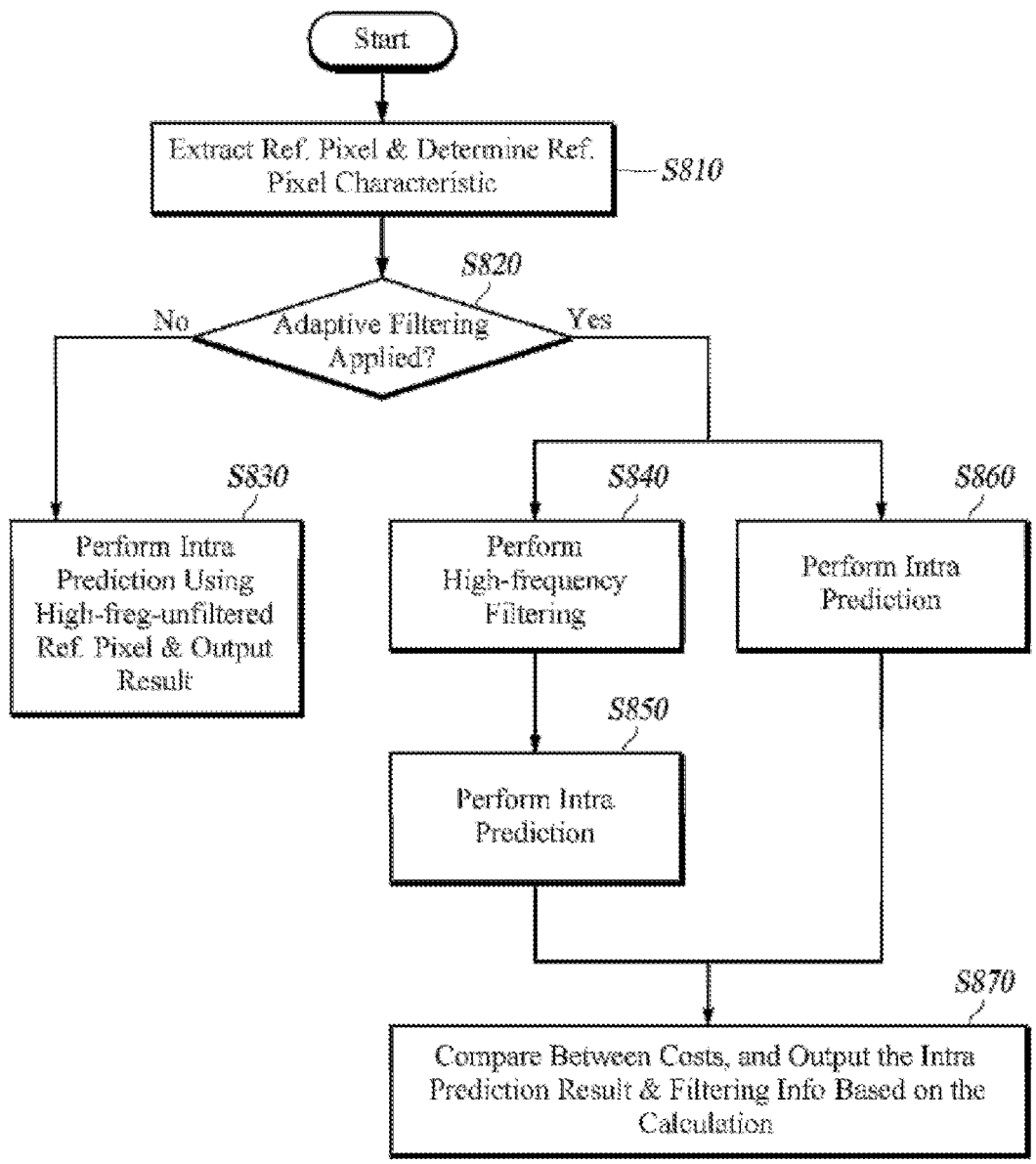
FIG. 8 is a flow chart for illustrating an encoding method according to one or more embodiment of the present disclosure.

FIG. 8 is a flow chart for illustrating an encoding method according to one or more embodiment of the present disclosure.

The reference pixel characteristics are determined by extracting one or more reference pixels included in the neighboring blocks of the target block to be encoded in step S810. Herein, the reference pixel characteristics may include the statistical characteristics of the reference pixels such as dispersion or the intra-image characteristics of the images configured by the reference pixels such as the presence or absence of the edges, and the like.

If the reference pixel characteristics are determined, it is determined whether an adaptive filtering is applied to the intra prediction based on the reference pixel characteristics (S820). For example, it may determined that the adaptive filtering is not applied when the dispersion of the reference pixels is smaller than the preset threshold value or the edges are present in the neighboring blocks, and the like, otherwise it may determined that the adaptive filtering is applied.

If it is determined that the adaptive filtering is not applied, the intra prediction is performed by using the original high-frequency-unfiltered reference pixels and the results are output (S830).

However, upon determining the application of the adaptive filtering, the intra prediction is performed based on the adaptive filtering.

That is, the high-frequency filtering is performed on the reference pixels and the intra prediction is performed by using the filtered reference pixels (S840 and S850). Then, the intra prediction is performed by using the high-frequency-unfiltered reference pixels (S860). Further, calculations are made for the costs when the encoding is performed using the intra prediction results by the steps S840 and S850 and the costs when the encoding is performed using the intra prediction results through step S860 and then the cost-efficient intra prediction results are output. In this case, the intra prediction results are output along with the filtering information for indicating whether the results are with or without the use of the high-frequency filtered reference pixels (S870).

Hereinafter, a decoding apparatus according to one or more embodiment of the present disclosure will be described with reference to FIGS. 9 and 10.

Figure 9:
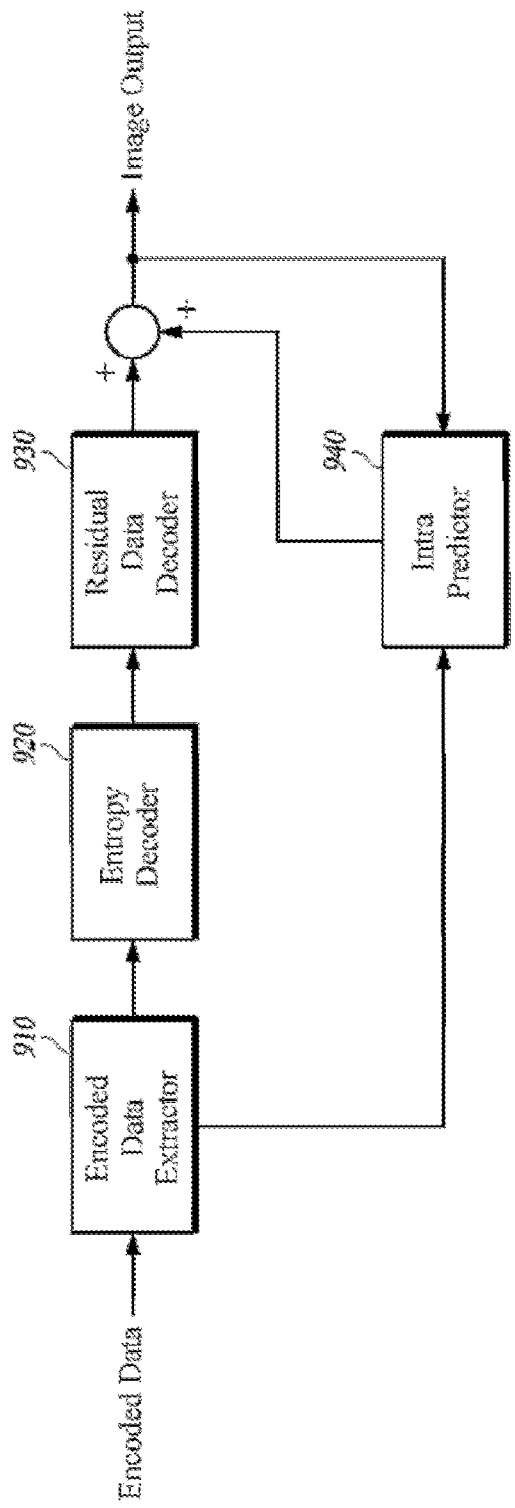
FIG. 9 is a block diagram for illustrating a configuration of a decoding apparatus according to one or more embodiment of the present disclosure.

FIG. 9 is a block diagram for illustrating a configuration of the decoding apparatus according to one or more embodiment of the present disclosure.

The decoding apparatus according to one or more embodiment of the present disclosure may include an encoded data extractor 910, an entropy decoder 920, a residual data decoder 930, an intra predictor 940, and the like.

Herein, as with the encoding apparatus described with reference to FIG. 2, the decoding apparatus may represent a personal computer (PC), a notebook computer, a personal digital assistant (PDA), a portable multimedia player (PMP), a PlayStation Portable (PSP), a mobile communication terminal, and the like, and may mean various apparatuses including a communication device such as a communication modem that performs communication with various devices or wired/wireless communication networks, a memory that stores various programs and data to decode images, a microprocessor that executes programs so as to perform calculation and controlling, and the like.

The encoded data extractor 910 extracts and analyzes the received encoded data and transfers data for the residual blocks to the entropy decoder 920 and data required for other predictions, for example, the macroblock mode, the encoded prediction information (information on the intra prediction mode, and the like) to the intra predictor 940.

The entropy decoder 920 performs the entropy decoding on the residual blocks input from the encoded data extractor 910 to generate quantized residual blocks. Although not illustrated in one or more embodiment of the present disclosure, if necessary, the entropy decoder 920 may decode a variety of information required to decode the encoded data as well as the residual blocks. Herein, the variety of information required to decode the encoded data may include information on a block type, information on an intra prediction mode, information on transform and quantization types, and the like. The entropy decoder 920 may be defined by various methods according to the entropy encoding method used for the entropy encoder 440 of the encoding apparatus to which one or more embodiment of the present disclosure is applied.

The residual data decoder 930 performs the same process as the residual data decoder 240 of the encoding apparatus according to one or more embodiment of the present disclosure to reconstruct the residual blocks. That is, the residual blocks are reconstructed by dequantizing the quantized residual blocks received from the entropy decoder and inversely transforming the dequantized residual blocks.

The intra predictor 940 performs the intra prediction based on the intra prediction mode information extracted from the encoded data extractor to generate an intra prediction block.

In particular, the intra predictor 940 according to one or more embodiment of the present disclosure uses the reference pixels included in the neighboring blocks of the target block to be decoded to determine the reference pixel characteristics and determines whether the encoding apparatus performed the intra prediction to which an adaptive filtering was applied, based on the reference pixel characteristics. If it is determined that the adaptive filtering was applied, which would have included the filtering information in the encoded data received from the encoding apparatus, the filtering information is extracted from the encoded data. Further, the intra prediction is performed by using the high-frequency filtered reference pixels based on the extracted filtering information or the intra prediction is performed by using the original high-frequency-unfiltered reference pixels and the results are output. However, if it is determined that the adaptive filtering was not applied resulting in the absence of filtering information in the encoded data, the intra prediction is performed by using the original high-frequency-unfiltered reference pixels and the results are output.

The results (intra prediction block) output from the intra predictor 940 are added to the residual blocks reconstructed by the residual data decoder 930 so as to be reconstructed as the blocks of the original image.

Figure 10:
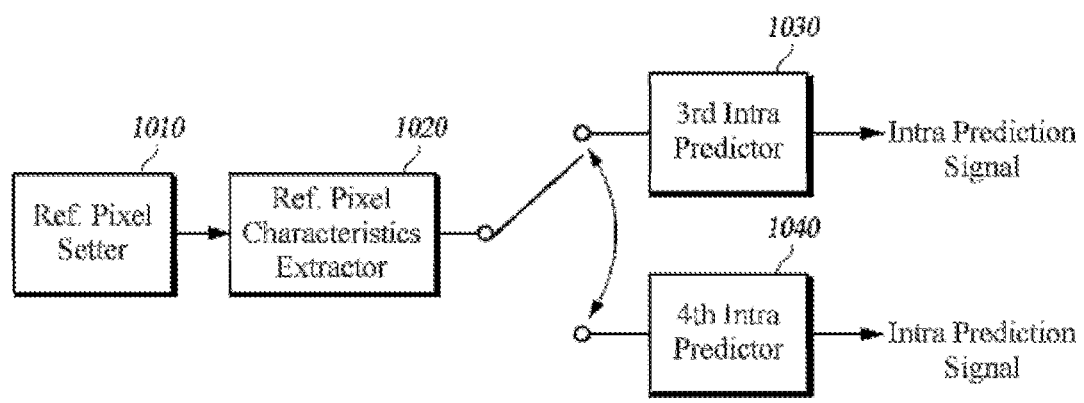
FIG. 10 is a block diagram for illustrating a configuration of an intra predictor of the decoding apparatus according to one or more embodiment of the present disclosure.

FIG. 10 is a block diagram for illustrating a configuration of the intra predictor 940 according to one or more embodiment of the present disclosure.

As illustrated in FIG. 10, the intra predictor 940 according to one or more embodiment of the present disclosure may include a reference pixel setter 1010, a reference pixel characteristics extractor 1020, a third intra predictor 1030, and a fourth intra predictor 1040, and the like.

The reference pixel setter 1010 extracts from a reference picture memory the pixels (reference pixels) of neighboring blocks of the target block to be encoded.

The reference pixel characteristics extractor 1020 receives reference pixel values transferred from the reference pixel setter 1010 to determine the reference pixel characteristics and determines whether to apply an adaptive filtering. Further, the reference pixel values are transferred to any one of the third intra predictor 1030 and the fourth intra predictor 1040 based on the determined results. Herein, the reference pixel characteristics may include the statistical characteristics of the reference pixel, the intra-image characteristics configured by the reference pixels, or the like.

The reference pixel setter 1010 and the reference pixel characteristics extractor 1020 each have the same functions as the reference pixel setter 310 and the reference pixel characteristics extractor 320 of the encoding apparatus according to one or more embodiment of the present disclosure, and therefore the detailed description thereof will be omitted so as to avoid the repeated description.

The third intra predictor 1030 extracts the filtering information from the encoded data if it is determined that the reference pixel characteristics extractor 1020 applies the adaptive filtering. In addition, if the extracted filtering information indicates that the high-frequency filtering is performed, the high-frequency filtering is performed on the reference pixels and the intra prediction is performed using the high-frequency filtered reference pixels. However, if the extracted filtering information indicates that the high-frequency filtering is not performed, the high-frequency filtering is not performed and the intra prediction is performed using the original reference pixels and the results are output.

If it is determined that the reference pixel characteristics extractor 1020 does not apply the adaptive filtering, the fourth intra predictor 1040 performs the intra prediction by using the original high-frequency-unfiltered reference pixels and outputs the results.

The reference pixel characteristics extractor 1020 of the decoding apparatus has the same configuration as the reference pixel characteristics extractor 320 of the encoding apparatus.

Therefore, if it is determined that the reference pixel characteristics extractor 1020 of the decoding apparatus applies the adaptive filtering, as it means that the reference pixel characteristics extractor 320 of the encoding apparatus equally determined to apply the adaptive filtering, the filtering information is included in the encoded data output by the encoding apparatus. Therefore, the third intra predictor 1030 extracts the filtering information from the encoded data and performs the intra prediction based on the filtering information.

On the other hand, if the reference pixel characteristics extractor 1020 of the decoding apparatus determines not to apply the adaptive filtering, which reflects nonapplication of the adaptive filtering by the reference pixel characteristics extractor 320 of the encoding apparatus either, no filtering information then is included in the encoded data output by the encoding apparatus. In this case, therefore, the fourth intra predictor 1040 immediately uses the high-frequency-unfiltered original reference pixels to perform the intra prediction without considering the filtering information.

Figure 11:
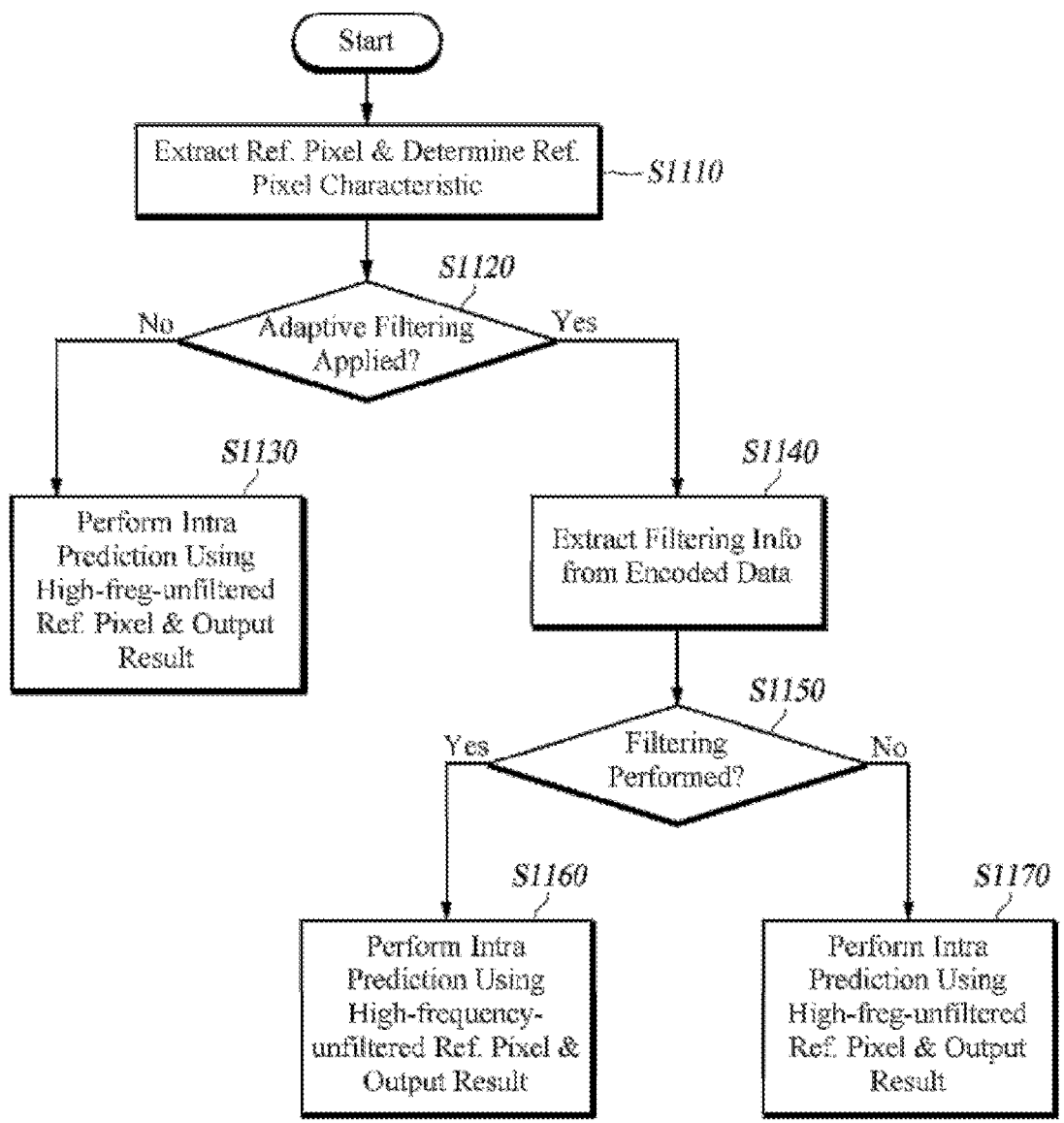
FIG. 11 is a flow chart for illustrating a decoding method according to one or more embodiment of the present disclosure.

FIG. 11 is a flow chart for illustrating a decoding method according to one or more embodiment of the present disclosure.

The reference pixel characteristics are determined by extracting one or more reference pixels included in the neighboring blocks of the target block to be encoded (S1110). Herein, the reference pixel characteristics may include the statistical characteristics of the reference pixels such as dispersion or the intra-image characteristics configured by the reference pixels such as the presence or absence of the edges, and the like.

If the reference pixel characteristics are determined, it is determined whether to apply the adaptive filtering based on the reference pixel characteristics (S1120). For example, if the dispersion of the reference pixels is at the preset threshold value or less or the edges are present in the neighboring blocks, it may be determined that the adaptive filtering is not applied, otherwise it may be determined that the adaptive filtering is applied.

If it is determined that the adaptive filtering is not applied in step S1120, the intra prediction is performed by using the original high-frequency-unfiltered reference pixels and the results are output (S1130).

However, if it is determined that the adaptive filtering is applied in step S1120, the filtering information is extracted from the encoded data (S1140) and the extracted filtering information is checked (S1150). As the checked result, if the filtering information indicates that the high-frequency filtering is to be performed, the intra prediction is performed by using the high-frequency filtered reference pixels and the result is output (S1160). However, if the filtering information indicates that the no high-frequency filtering is to be performed, the intra prediction is performed by using the original high-frequency-unfiltered reference pixels and the result is output (S1170).

In the description above, although all of the components of the embodiments of the present disclosure may have been described as assembled or operatively connected as a unit, the present disclosure is not intended to limit itself to such embodiments. Rather, within the objective scope of the present disclosure, the respective components may be selectively and operatively combined in any numbers. Every one of the components may also be implemented by itself in hardware while the respective ones can be combined in part or as a whole selectively and implemented in a computer program having program modules for executing functions of the hardware equivalents. Codes or code segments to constitute such a program may be easily deduced by a person skilled in the art. The computer program may be stored in computer readable media, which in operation can realize the embodiments of the present disclosure. The computer readable media may include magnetic recording media, optical recording media, and carrier wave media.

In addition, terms like 'include', 'comprise', and 'have' should be interpreted in default as inclusive or open rather than exclusive or closed unless expressly defined to the contrary. All the terms that are technical, scientific or otherwise agree with the meanings as understood by a person skilled in the art unless defined to the contrary. Common terms as found in dictionaries should be interpreted in the context of the related technical writings not too ideally or impractically unless the present disclosure expressly defines them so.

The spirit of the present disclosure has been just exemplified. It will be appreciated by those skilled in the art that various modifications and alterations can be made without departing from the essential characteristics of the present disclosure. Therefore, exemplary embodiments of the present disclosure have not been described for limiting purposes. Accordingly, the scope of the disclosure is not to be limited by the above embodiments but by the claims and the equivalents thereof.

INDUSTRIAL APPLICABILITY

As described above, the present disclosure is highly useful in effectively decreasing the generation frequency of the index signal for the application of the additional filter generated by the adaptive filtering in the intra prediction to provide the higher compression coding efficiency, controlling the strictness and leniency of the determination criterion on whether to apply the adaptive filtering to provide the efficient rate-distortion control factor of the video compression encoder, and eventually decreasing the complexity of the encoding and decoding processes occurring due to the repetitive filtering and the intra prediction cycles when the adaptive filtering is removed.

CROSS-REFERENCE TO RELATED APPLICATION

If applicable, this application claims priority under 35 U.S.C §119(a) of Patent Application No. 10-2010-0083026, filed on Aug. 26, 2010 in Korea, the entire content of which is incorporated herein by reference. In addition, this non-provisional application claims priority in countries, other than the U.S., with the same reason based on the Korean Patent Application, the entire content of which is hereby incorporated by reference.

The invention claimed is:

1. An encoding apparatus using intra prediction, the encoding apparatus comprising:
a reference pixel characteristics extractor for receiving one or more reference pixel included in neighboring blocks of a target block to be encoded to determine a reference pixel characteristic and determining whether an adaptive filtering is applied to the one or more reference pixel, based on the reference pixel characteristic;
a first intra predictor responsive to when the adaptive filtering is determined by the reference pixel characteristics extractor to be applied for comparing between results of performing an intra prediction using a high-frequency filtered reference pixel and an intra prediction using a high-frequency-unfiltered reference pixel to output cost-efficient one of the results involving costs along with filtering information indicating whether to perform filtering or not; and
a second intra predictor for outputting the result of performing the intra prediction using the high-frequency-unfiltered reference pixel when the reference pixel characteristics extractor determines that the adaptive filtering is not to be applied.

2. The encoding apparatus of claim 1, wherein the reference pixel characteristics extractor uses statistical characteristics of the one or more reference pixel to determine the reference pixel characteristic.

3. The encoding apparatus of claim 2, wherein the reference pixel characteristics extractor determines that the adaptive filtering is not applied, when a dispersion of the one or more reference pixel is equal to or less than a preset threshold value.

4. The encoding apparatus of claim 3, wherein the preset threshold value is determined by $$T = \left\lfloor \frac{Qstep^2 + 8}{16} \right\rfloor$$

(T represents the threshold value and Qstep represents a width of a quantization interval).

5. The encoding apparatus of claim 1, wherein the reference pixel characteristics extractor determines whether edges are present in the neighboring blocks and if it is determined that the edges are present, determines that the adaptive filtering is not to be applied.

6. The encoding apparatus of claim 1, wherein the reference pixel characteristics extractor includes:
a statistical characteristics extractor for determining whether the dispersion of the one or more reference pixel is equal to or less than a preset threshold value;
an edge detector for detecting whether edges are present in the neighboring blocks; and
a filtering determiner for determining that the adaptive filtering is not to be applied if the statistical characteristics extractor determines that the dispersion is equal to or less than the preset threshold value or when the edge detector detects the edges.

7. The encoding apparatus of claim 1, wherein the first intra predictor calculates the costs by a method using at least one of rate-distortion and a bit amount required to encode data.

8. A decoding apparatus using intra prediction, the decoding apparatus comprising:
a reference pixel characteristics extractor for receiving one or more reference pixel included in neighboring blocks of a target block to be decoded to determine a reference pixel characteristic and determining whether an adaptive filtering is applied to the one or more reference pixel, based on the reference pixel characteristic;
a first intra predictor responsive to when the reference pixel characteristics extractor determines that the adaptive filtering is applied for extracting filtering information from encoded data received from an encoding apparatus and using extracted filtering information as a basis for outputting either one of the results of performing an intra prediction using a high-frequency filtered reference pixel and an intra prediction using a high-frequency-unfiltered reference pixel; and
a second intra predictor responsive to when the reference pixel characteristics extractor determines that the adaptive filtering is not applied for determining that the filtering information is not present in the encoded data and outputting the result of performing the intra prediction using the high-frequency-unfiltered reference pixel.

9. The decoding apparatus of claim 8, wherein the reference pixel characteristics extractor uses statistical characteristics of the one or more reference pixel to determine the reference pixel characteristic.

10. The decoding apparatus of claim 9, wherein the reference pixel characteristics extractor determines that the adaptive filtering is not applied, when a dispersion of the one or more reference pixel is equal to or less than a preset threshold value.

11. The decoding apparatus of claim 8, wherein the reference pixel characteristics extractor determines whether edges are present in the neighboring blocks and if it is determined that the edges are present, determines that the adaptive filtering is not applied.

12. The decoding apparatus of claim 8, wherein the reference pixel characteristics extractor includes:
a statistical characteristics extractor for determining whether the dispersion of the one or more reference pixel is equal to or less than a preset threshold value;
an edge detector for detecting whether edges are present in the neighboring blocks; and
a filtering determiner for determining that the adaptive filtering is not to be applied if the statistical characteristics extractor determines that the dispersion is equal to or less than the preset threshold value or when the edge detector detects the edges.

13. An encoding method using intra prediction, the encoding method comprising:
a reference pixel characteristics extraction process for receiving one or more reference pixel included in neighboring blocks of a target block to be encoded to determine a reference pixel characteristic and determining whether an adaptive filtering is applied to the one or more reference pixel, based on the reference pixel characteristic;
a first intra prediction process responsive to when the adaptive filtering is determined in the reference pixel characteristics extraction process to be applied for comparing between results of performing an intra prediction using a high-frequency filtered reference pixel and an intra prediction using a high-frequency-unfiltered reference pixel to output cost-efficient one of the results involving costs along with filtering information indicating whether to perform filtering or not; and
a second intra prediction process for outputting the result of performing the intra prediction using the high-frequency-unfiltered reference pixel when the reference pixel characteristics extracting process determines that the adaptive filtering is not to be applied.

14. The encoding method of claim 13, wherein the reference pixel characteristics extracting process uses statistical characteristics of the one or more reference pixel to determine the reference pixel characteristic.

15. The encoding method of claim 14, wherein the reference pixel characteristics extracting process determines that the adaptive filtering is not applied, when a dispersion of the one or more reference pixel is equal to or less than a preset threshold value.

16. The encoding method of claim 15, wherein the preset threshold value is determined by $$T = \left\lfloor \frac{Qstep^2 + 8}{16} \right\rfloor$$

(T represents the threshold value and Qstep represents a width of a quantization interval).

17. The encoding method of claim 13, wherein the reference pixel characteristics extracting process determines whether edges are present in the neighboring blocks and if it is determined that the edges are present, determines that the adaptive filtering is not to be applied.

18. The encoding method of claim 13, wherein the reference pixel characteristics extracting process includes:
a statistical characteristics extracting process for determining whether the dispersion of the one or more reference pixel is equal to or less than a preset threshold value;
an edge detection process for detecting whether edges are present in the neighboring blocks; and
a filtering determination process for determining that the adaptive filtering is not to be applied if the statistical characteristics extracting process determines that the dispersion is equal to or less than the preset threshold value or when the edge detection process detects the edges.

19. The encoding method of claim 13, wherein the first intra prediction process calculates the costs by a method using at least one of rate-distortion and a bit amount required to encode data.

20. A decoding method using intra prediction, the decoding method comprising:
a reference pixel characteristics extraction process for receiving one or more reference pixel included in neighboring blocks of a target block to be decoded to determine a reference pixel characteristic and determining whether an adaptive filtering is applied to the one or more reference pixel, based on the reference pixel characteristic;
a first intra prediction process responsive to when the reference pixel characteristics extracting process determines that the adaptive filtering is applied for extracting filtering information from encoded data received from an encoding apparatus and using extracted filtering information as a basis for outputting either one of the results of performing an intra prediction using a high-frequency filtered reference pixel and an intra prediction using a high-frequency-unfiltered reference pixel; and
a second intra prediction process responsive to when the reference pixel characteristics extractor determines that the adaptive filtering is not applied for determining that the filtering information is not present in the encoded data and outputting the result of performing the intra prediction using the high-frequency-unfiltered reference pixel.

21. The decoding method of claim 20, wherein the reference pixel characteristics extracting process uses statistical characteristics of the one or more reference pixel to determine the reference pixel characteristic.

22. The decoding method of claim 21, wherein the reference pixel characteristics extracting process determines that the adaptive filtering is not applied, when a dispersion of the one or more reference pixel is equal to or less than a preset threshold value.

23. The decoding method of claim 20, wherein the reference pixel characteristics extracting process determines whether edges are present in the neighboring blocks and if it is determined that the edges are present, determines that the adaptive filtering is not applied.

24. The decoding method of claim 20, wherein the reference pixel characteristics extracting process includes:
a statistical characteristics extracting process for determining whether the dispersion of the one or more reference pixel is equal to or less than a preset threshold value;
an edge detection process for detecting whether edges are present in the neighboring blocks; and
a filtering determination process for determining that the adaptive filtering is not to be applied if the statistical characteristics extracting process determines that the dispersion is equal to or less than the preset threshold value or when the edge detection process detects the edges.

* * * * *